United States Patent
Ouvrier-Buffet et al.

(10) Patent No.: US 7,388,210 B2
(45) Date of Patent: Jun. 17, 2008

(54) ENHANCED PROCESSING CIRCUIT FOR SPECTROMETRY SYSTEM AND SPECTROMETRY SYSTEM USING SAME

(75) Inventors: Patrice Ouvrier-Buffet, Saint Jorioz (FR); Jacques Rustique, Seyssinet (FR); Loïck Verger, Grenoble (FR)

(73) Assignee: Commissariat a l'Energie Atomique, Paris (FR)

( * ) Notice: Subject to any disclaimer, the term of this patent is extended or adjusted under 35 U.S.C. 154(b) by 312 days.

(21) Appl. No.: 10/536,505

(22) PCT Filed: Nov. 20, 2003

(86) PCT No.: PCT/FR03/50125
§ 371 (c)(1),
(2), (4) Date: May 25, 2005

(87) PCT Pub. No.: WO2004/051314
PCT Pub. Date: Jun. 17, 2004

(65) Prior Publication Data
US 2006/0012250 A1 Jan. 19, 2006

(30) Foreign Application Priority Data
Nov. 25, 2002 (FR) ................................. 02 14737

(51) Int. Cl.
*G01T 1/24* (2006.01)
*H01L 27/146* (2006.01)

(52) U.S. Cl. ................................. 250/370.13

(58) Field of Classification Search ............. 250/370.13
See application file for complete search history.

(56) References Cited

U.S. PATENT DOCUMENTS

| 4,692,626 | A | | 9/1987 | Westphai |
| 4,727,256 | A | * | 2/1988 | Kumazawa ............... 250/370.1 |
| 5,220,179 | A | * | 6/1993 | Gagea ........................ 250/574 |
| 5,821,538 | A | | 10/1998 | De Antoni et al. |
| 5,920,071 | A | * | 7/1999 | Weirauch ............... 250/370.13 |
| 6,172,362 | B1 | * | 1/2001 | Lingren et al. ........... 250/252.1 |
| 6,420,710 | B1 | * | 7/2002 | Verger et al. ........... 250/370.06 |

FOREIGN PATENT DOCUMENTS

JP  2000243555  11/2000

* cited by examiner

*Primary Examiner*—David Porta
*Assistant Examiner*—David S Baker
(74) *Attorney, Agent, or Firm*—Thelen Reid Brown Raysman & Steiner LLP (57) ABSTRACT

This is a processing circuit for a spectrometry chain including a particle radiation detector (21), including a charge preamplifier stage (20) receiving a current (I1) from the detector, representative of the amount of charges emitted by a particle which has interacted with the detector, and an integrator stage (26). A differentiator stage (25) is connected between the charge preamplifier stage (20) and the integrator stage (26), the differentiator stage (25) receiving a signal (V1) from the charge preamplifier stage (20) and delivering to the integrator stage (26), a signal (V2), image of the detector current (I1), the integrator stage (26) delivering, an image (V3) of the amount of charges emitted by a particle which has interacted with the detector.

Application notably to the high energy single channel probes.

12 Claims, 6 Drawing Sheets

ENHANCED PROCESSING CIRCUIT FOR SPECTROMETRY SYSTEM AND SPECTROMETRY SYSTEM USING SAME

CROSS-REFERENCE TO RELATED APPLICATIONS

This application claims priority based on International Patent Application No. PCT/FR2003/050125, entitled "Enhanced Processing Circuit for Spectrometry System and Spectrometry System Using Same" by Patrice OUVRIER-BUFFET, Jacques RUSTIQUE, Loick VERGER, which claims priority of French Application No. 02/14737, filed on Nov. 25, 2002, and which was not published in English.

TECHNICAL FIELD

The present invention relates to a processing circuit for a spectrometry chain and to a spectrometry chain provided with such a circuit. A spectrometry chain is a device capable of measuring the energy of particle radiation incident on a radiation detector. Such a spectrometry chain also allows the number of incident particles to be counted per unit time. Particle radiation means the emission or transfer of energy in the form of particles. For example, the radiation may consist of photons (photons being considered as stable elementary particles), be gamma radiation which is radiation consisting of photons emitted during a nuclear transition or particle annihilation process, it may be X radiation or a flux of neutrons or protons.

Spectrometry chains find notably their application in the medical field, in non-destructive testing or in scientific instrumentation. Gamma cameras using two-dimensional radiation detectors are rapidly developing in the field of medical imaging. With one-dimensional radiation detectors, many single-channel probes are appearing on the market; for example, these are pre-operatory probes, nuclear probes for monitoring irradiated assemblies, probes for scientific instrumentation.

STATE OF THE PRIOR ART

Spectrometry chains conventionally include a particle radiation detector, a circuit for processing the signal delivered by the detector and a circuit for acquiring the signal delivered by the detector after processing. These spectrometry chains preferably use radiation detectors based on semiconductors such as CdZnTe, CdTe:Cl, DcTe:In, which allows them to operate at room temperature and be compact as they do not need any cooling device. These radiation detectors have other advantages. As they convert radiation directly into an electrical signal (generally used as an electrical current) instead of passing by the stage of electric charges like when a scintillator associated with a photomultiplier is used, excellent energy resolutions may be obtained.

The processing circuit should count and measure with the high possible precision, the energy of all the incident particles which have interacted with the detector (one then speaks of detection efficiency).

Depending on the field of use, incident particle radiation consists of an energy spectrum of more or less numerous particles (photons, neutrons or protons) with a very variable energy range (for example from a few keV to a few MeV for gamma spectrometry). The geometry of the semiconductor detector i.e. its surface and its thickness, should therefore be adapted, in a suitable way in order to obtain a desired detection efficiency and sensitivity of the spectrometry chain. As an example, a thickness less than one millimetre will be sufficient for stopping the majority of low energy photons whereas a thickness of a few millimetres or even one centimetre may be required for stopping higher energy photons. Low energy means energies less than about 100 keV.

The difficulty to obtain high quality spectrometry is larger at high energy than at low energy as the volume (i.e. the product of its surface by its thickness) of the semiconducting material of the detector required for absorbing high energy particles should be larger. With a large thickness, a maximum number of particles may be stopped. The interaction probability is increased. On the other hand, the larger the volume, the more it is difficult to maintain a homogeneous field all along the trajectory of the charges generated by conversion in the detector and to also avoid the charge-trapping effects in the semiconducting material.

These effects cumulated with the fact that ionisation charges are generated in different areas of the detector imply that thick detectors will deliver current pulses with large variations in shape. This effect of varying the shape of the current is known as the ballistic deficit.

One therefore tries to have the processing circuit adapted to this large variation in shape of the current, and have it deliver a signal which expresses the value of the energy of the incident particles with the highest possible precision. In other words, one tries to compensate the ballistic deficit and to improve the counting rates.

Figure 1:
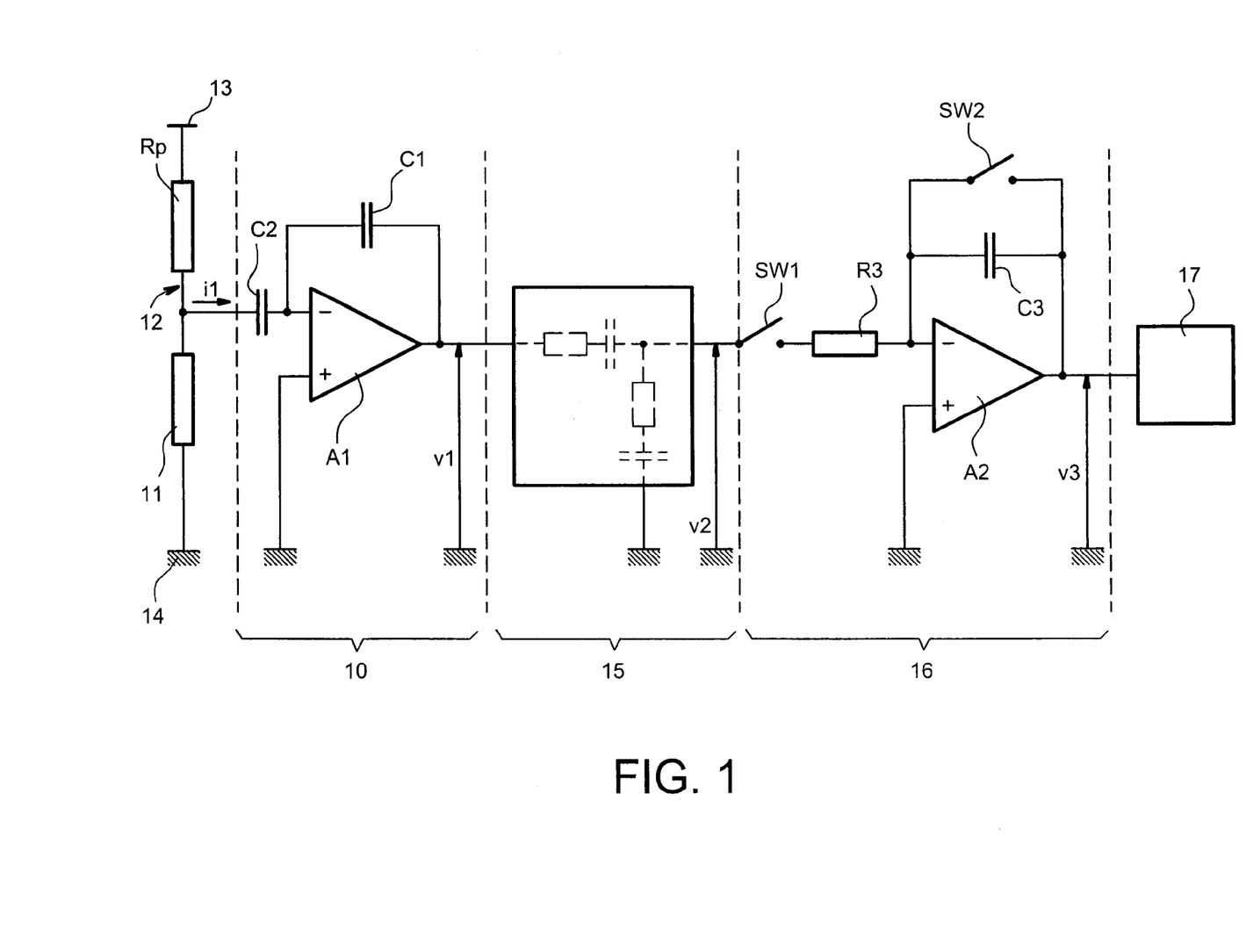
FIG. 1 (already described) shows an electrical diagram of a spectrometry chain from the prior art.

Conventional processing circuits include several successive stages among which the first is a charge preamplifier which is intended to be connected to the detector, the second is a pulse filter and the third is a stage for measuring the amplitude of pulses obtained at the output of the pulse filter. Such a processing circuit is illustrated in FIG. 1.

The charge preamplifier bears reference 10. It is an amplifier A1 made with discrete components (for example, a field effect transistor) or integrated components for example of the ASIC type, mounted as a current integrator. Operational amplifiers are not suitable for this function as they are too noisy. An integration capacitor C1 is mounted between the input and the output of the operational amplifier A1. An electric signal i1 from a semiconductor particle radiation detector 11 is inputted to the operational amplifier A1. This particle radiation detector 11 is mounted in series with a resistor Rp in a divider bridge 12. The divider bridge 12 is connected between two power supply terminals 13, 14 of a power supply (not shown). This divider bridge has a common point between the resistor Rp and the detector 11 and this common point is connected to the input of the operational amplifier via capacitor C2. Signal i1 is a pulsed current, it is a so-called detector current. These pulses may assume a large variety of shapes.

Figure 2:
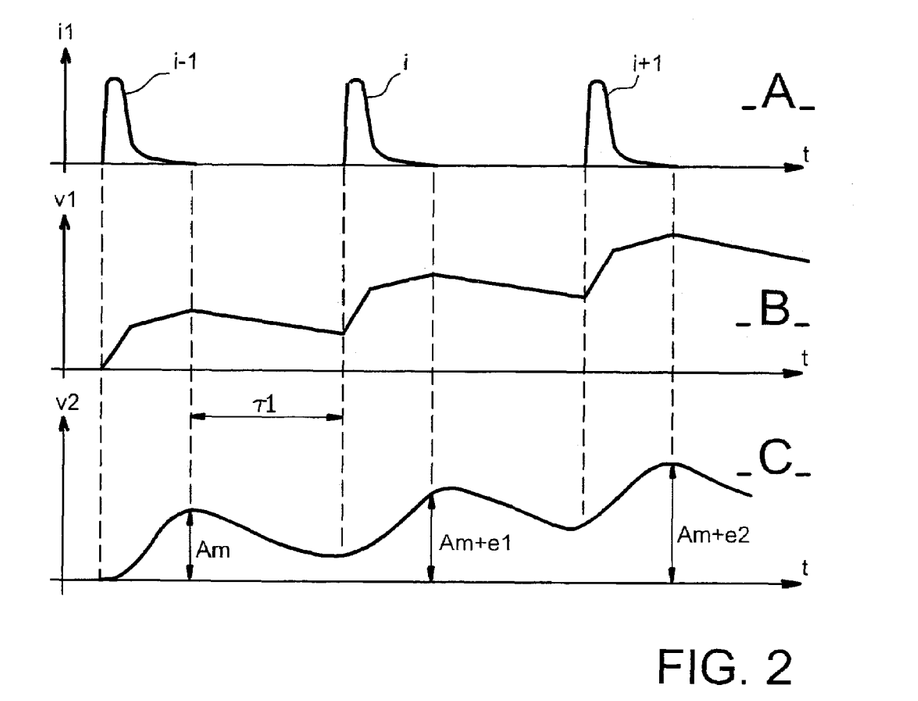
FIG. 2 (already described) shows time diagrams illustrating, with reference A, the current i1 delivered by the particle radiation detector, with reference B, the voltage v1 delivered by the charge preamplifier and with reference C, the voltage v2 delivered by the pulse filter of the spectrometry chain of FIG. 1.

Curves A and B of FIG. 2 are time diagrams of the detector current i1 at the input of the charge preamplifier 10 and of the voltage v1 delivered at the output of the charge preamplifier 10.

During the presence time of the current pulses i1, the voltage v1 at the output of the preamplifier is:

$$v1 = -1/C1 \int i1 \, dt = -Q/c1$$

Q is the amount of charges emitted by a particle which has interacted with the detector 11. At the output of the charge preamplifier 10, voltage v1 decreases in the absence of a current pulse i1. This time interval is called the relaxation time $\tau 1$. The information corresponding to the energy of the particles is transient. The voltage v1 must be saved as quickly as possible after disappearance of a current pulse i1.

The voltage v1 is applied to the input of a pulse filter 15. This is a band-pass filter which allows the signal to noise ratio to be optimized. A large number of pulse filters have been developed among which filters with n differentiations and n integrations, gaussian or semi-gaussian filters, trapezoidal filters, triangular filters, digital filters. Very often, these filters are tunable and by setting the derivative and integral time constants, it is possible to experimentally adjust at best the signal-to-noise ratio in the useful frequency band. It is known that semi-gaussian or triangular filters are well suited for high counting rates as they provide fast shaping of the pulses.

The goal is to obtain at the output of the band-pass filter 15, voltage pulses, the amplitude Am of which is proportional to the energy of the particles which have interacted with the detector 11. Curve C of FIG. 2 shows the voltage v2, present at the output of the pulse filter 15. It is noted that the pulse filter 15 distorts the time information corresponding to the current duration i1 provided by the detector 11. The width of the pulses is increased because of the derivation and integration performed by the pulse filter. This effect reduces the maximum admissible counting rate by increasing the number of stages in the processing circuit.

The arrival of a detector current pulse i1 of rank i (i is an integer larger than or equal to 2) may occur before voltage v2 has resumed the value it had at the beginning of the detector current pulse i1 of rank i-1. If the amplitude of voltage v2 during the detector current pulse i1 of rank i-1 has a value of Am, the amplitude of the voltage v2 during the detector current pulse i1 of rank i will have the value Am+e1 and the amplitude of the voltage v2 during the detector current pulse i1 of rank i+1 will have the value Am+E2. The amplitude of the voltage v2 is marred with all the more errors as the counting rate is high.

Another drawback of the pulse filter 15 is its poor linearity when it is used with thick detectors which deliver current pulses with possibly large variations in shape. This drawback corresponds to the error of ballistic deficit. It is known how to select the time constant of the filter to be much larger than the duration of the detector current pulses i1, in order to attempt to reduce this error. This solution is in contradiction with the desire of obtaining a voltage v2 with short period pulses, which allows a high counting rate.

The output of the pulse filter is connected to means 16 for measuring the amplitude of the pulses obtained at the output of the pulse filter 15. Several circuits may be used for making these amplitude measurement means 16. For example, a peak detector based on diodes or on a switch-controllable active integrator. It is commonly recognized that higher counting rates may be achieved with the switch-controllable integrator.

The amplitude measurement means 16 of FIG. 1 include an operational amplifier A2 mounted as an integrator. An integration capacitor C3 is mounted between the input and the output of the operational amplifier A2. A resistor R3 has an end connected to the input of the operational amplifier and another end connected to the output of the pulse filter 15 via a first switch SW1. A second switch SW2 is mounted in parallel with the integration capacitor C3. It is used for resetting the integrator.

Figure 3:
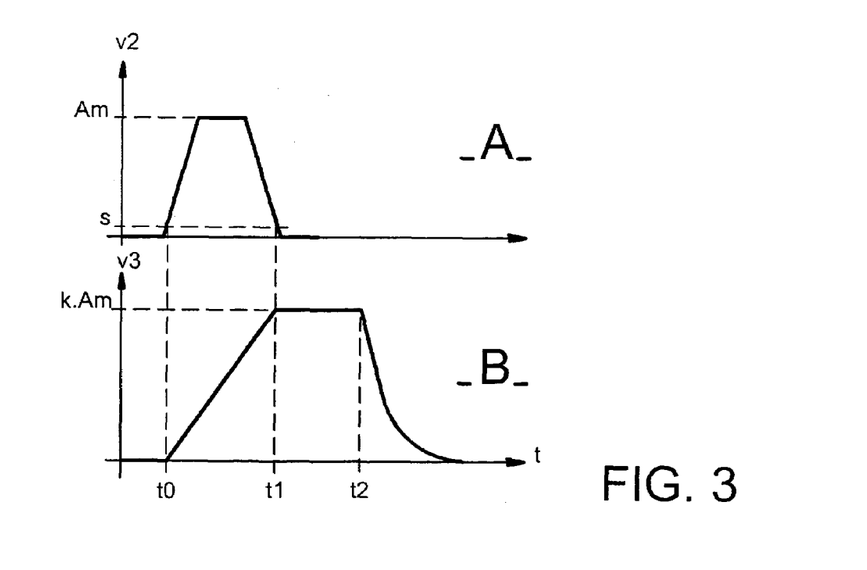
FIG. 3 (already described) shows time diagrams illustrating, with reference A, a voltage pulse v2 and with reference B, the voltage v3 delivered by a spectrometry chain comparable to that of FIG. 1.

Reference will now be made to FIG. 3 which illustrates as time diagrams and schematically, the pulse signal v2 delivered by the pulse filter (curve A) and the signal v3 delivered by the means for measuring the amplitude of the pulses obtained at the output of the pulse filter (curve B), respectively. Before the signal v2 from the pulse filter 15 arrives at the input of the amplitude measuring means 16, i.e., prior to an instant t0, the first switch SW1 is open and the second switch SW2 is closed. As soon as the signal v2 crosses a threshold s, at instant t0, the first switch SW1 closes and the second switch SW2 opens. The amplitude measurement means 16 begin to integrate the signal v2 until instant t1 which marks the passage of the signal v2 to below the threshold s. At this instant t1, the first switch SW1 opens. The signal v3 delivered by the amplitude measurement means 16 has an amplitude kAm which is proportional to the amplitude Am of signal v2. But this amplitude kAm is only proportional to the energy of the particle having interacted with the detector 11 to the extent that amplitude Am accurately expressed the energy of the particle having interacted with the detector 11. It was seen earlier that this is not always the case because of the defects caused by the pulse filter 15.

From instant t1 to instant t2, the signal v3 is kept substantially constant so that its amplitude may be saved in an acquisition device 17 connected to the output of the amplitude measurement means 16. From instant t2, the second switch SW2 is closed which has the effect of bringing back the signal v3 to zero. The amplitude measurement means 16 are then ready for treating a new particle.

DISCUSSION OF THE INVENTION

The object of the present invention is to make a processing circuit for a spectrometry chain which does not have the above limitations and difficulties, these difficulties being notably caused by the pulse filter.

Its object is to propose a processing circuit for a spectrometry chain which is able to deliver a signal expressing the energy of the incident particles with precision and this even with high counting rates.

To achieve this, the invention recommends replacement of the pulse filter with a differentiator delivering a signal which is an accurate image of the one from the radiation detector and which is representative of the energy of particles which interact with the detector.

More specifically, the present invention is a processing circuit for a spectrometry chain, including a particle radiation detector, this processing circuit including a charge preamplifier stage. receiving a current from the detector, representative of the amount of charges emitted by a particle which has interacted with the detector,. and an integrator stage. A differentiator stage is connected between the charge preamplifier stage and the integrator stage, the differentiator stage receiving a signal from the charge preamplifier stage and delivering to the integrator stage, a signal, image of the detector current, the integrator stage delivering an image of the amount of charges emitted by a particle which has interacted with the detector.

The charge preamplifier stage may include a discrete or integrated amplifier mounted as a current integrator.

The differentiator stage may include an operational amplifier mounted as a differentiator.

The integrator stage may include an operational amplifier mounted as an integrator.

The detector current is pulsed, and preferably, the integrator stage includes means for controlling the integration time during times substantially equal to the duration of each pulse of the detector current. In this way, the integrator circuit is self-adapted to the detector current.

The means for controlling the integration time may include a first switch inserted between the integrator and the output of the differentiator stage, a second switch for resetting the integrator, a logic circuit for controlling the switches, a comparator for enabling the logic circuit depending on the result of a comparison between the signal, image of the detector current, and a threshold.

The present invention also relates to a spectrometry chain which includes a thereby characterized processing circuit downstream from the particle radiation detector.

Such a spectrometry chain retains good linearity over a large range of energies to be measured.

Another object of the invention is to propose a spectrometry chain, the ballistic deficit of which is compensated and the counting rate of which is improved.

Still another object of the invention is to propose a spectrometry chain which may operate with several designs of detectors without any change.

The spectrometry chain may further include a circuit for acquiring the signal delivered by the integrator stage of the processing circuit, this acquisition circuit including an analog/digital converter followed by a memory.

A signal delivered by the logic circuit may condition the acquisition time.

The detector may be inserted with a resistor in a divider bridge circuit.

Advantageously, the detector is a semiconductor detector.

The semiconductor material may be selected from the group comprising CdZnTe, CdTe:Cl, CdTe:In.

SHORT DESCRIPTION OF THE DRAWINGS

The present invention will be better understood upon reading the description of exemplary embodiments, given as purely indicative and by no means limiting, with reference to the appended drawings wherein.

Identical, similar, or equivalent portions of the different figures described hereafter bear the same numerical references to facilitate passing from one figure to the other.

The different portions represented in the figures are not necessarily represented according to a uniform scale, to make the figures more legible.

DETAILED DISCUSSION OF PARTICULAR EMBODIMENTS

Figure 4:
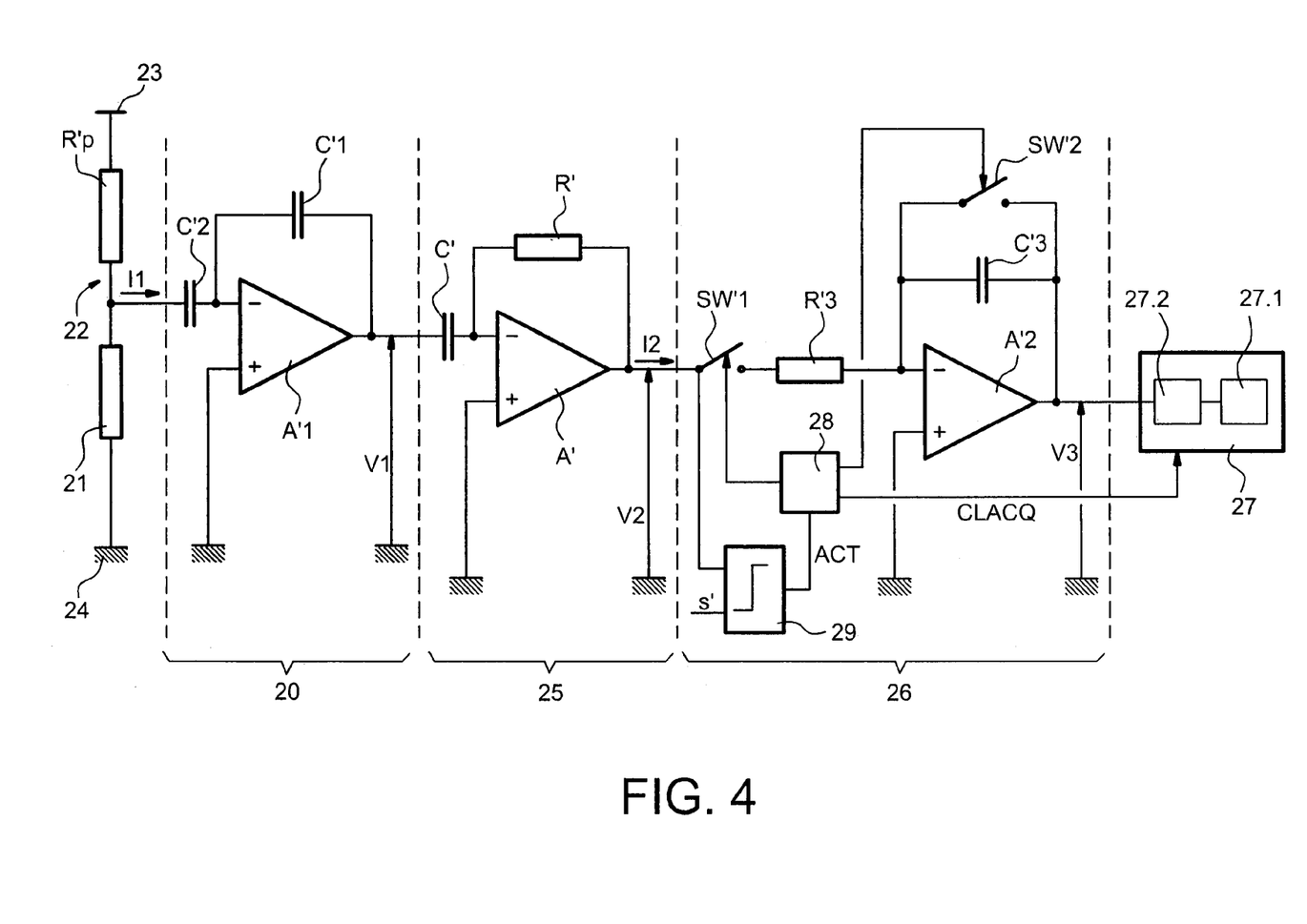
FIG. 4 is an electrical diagram of a processing circuit according to the invention and of a processing chain including such a processing circuit.

Reference is now made to FIG. 4 which shows an electrical diagram of a processing circuit according to the invention with which is provided a spectrometry chain according to the invention. Like in the prior art, the processing circuit is intended to cooperate with a detector 21, it includes three successive stages referenced 20, 25, 26, respectively. It is assumed that the detector 21 is comparable to that of FIG. 1 and that it is included in a divider bridge circuit 22, including a resistor R'p, which will not be discussed again for the sake of simplification. The power supply terminals bear references 23, 24, respectively.

Stage 20 is also comparable to that of FIG. 1. This is a charge preamplifier. It includes a discrete or integrated amplifier for example of the A'1 ASIC type, mounted as a current integrator. An integration capacitor C'1 is mounted between the input and the output of the preamplifier A'1. The latter has an input which is connected to the common point of the voltage divider 22 via a capacitor C'2. The charge preamplifier therefore receives a current i1 (a so-called detector current) delivered by the detector 21 when particles interact with it. It delivers a signal V1 such that:

$$V1(t) = -\frac{1}{C'1}\int I1(t)dt = -Q'/C'1 \tag{1}$$

Q' is the amount of charges emitted by a particle which has interacted with the detector 21.

The essential difference with the spectrometry chain of the prior art is that the next stage 25 is no longer formed with a pulse filter but with a differentiator. Conventionally, this differentiator includes an operational amplifier A' with a resistor R' connected between its input an its output. The input of the operational amplifier is connected to the output of the charge preamplifier stage 20 via a capacitor C'. The differentiator 25 implements the mathematical derivative function with respect to time on the signal V1(t) present at the output of the charge preamplifier 20. The differentiator stage 25 delivers un voltage V2(t) such that:

$$V2(t) = R'C' dV1(t)/dt \tag{2}$$

By combining expressions (1) and (2), it is found that the output voltage of the differentiator stage is expressed by:

$$V2(t) = \frac{R'C'}{C'1} I1(t) \tag{3}$$

The signal V2(t) is a signal proportional to the detector current I1(t), it is the so-called signal, image of the detector current I1(t).

Figure 5:
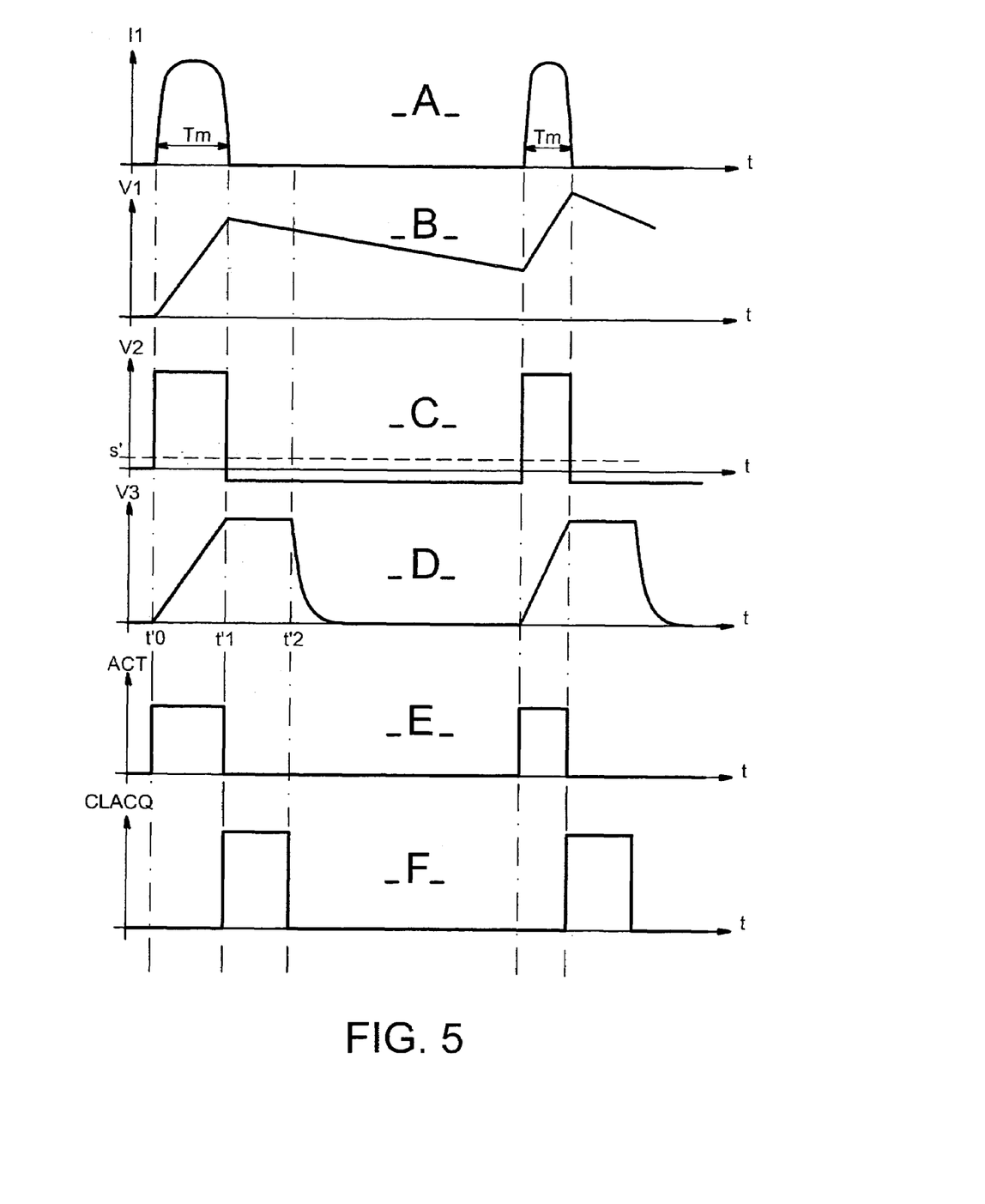
FIG. 5 shows time diagrams illustrating with reference A, the detector current i1 received by the processing circuit of FIG. 4, with reference B the voltage v1 present at the output of the charge preamplifier stage, with reference C the voltage v2 present at the output of the differentiator stage, with reference D, the voltage v3 present at the output of the integrator stage, with reference E, the ACT signal delivered by the comparator and with reference F, the CLACQ signal delivered to the acquisition circuit.

FIG. 5 illustrates with references A, B, C, time diagrams of signals I1, V1, V2 which are the detector current, the voltage at the output at the preamplifier stage and the voltage at the output of the differentiator stage, respectively. Signal V2(t) is a pulsed signal, the duration of which between instants t'0 and t'1 substantially corresponds to the duration of the pulses of the detector current. Signal V2(t) corresponds to the mathematical derivative of the signal V1(t). It therefore assumes a positive sign for increasing slopes of V1(t) and a negative sign for decreasing slopes.

The amplification ratio which is the ratio R'C'/C'1 is selected to be as large as possible. In the example which will be developed subsequently, the amplification ratio is selected to be equal to $10^7 \Omega$.

The active portion of the differentiator is configured (i.e. its operational amplifier A') so that it is sufficiently fast and delivers a signal V2 with sharp edges so that it expresses the time information of the detector current I1 as accurately as possible.

Figure 6:
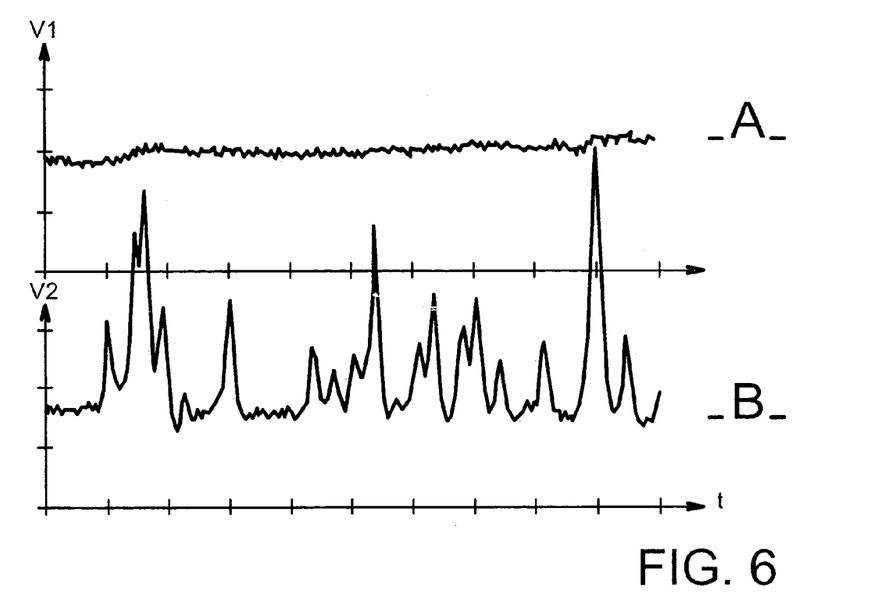
FIG. 6 respectively shows, with references A and B, changes in the voltage obtained at the output of the charge preamplifier and of the differentiator circuit of a processing circuit according to the invention during a test phase.

The differentiator stage 25 is a stage which practically is not a noise generator. Fed back to its input, the basic noise of the differentiator stage 25 is significantly less than the noise provided by the first stage 20 of the charge preamplifier. Typically, it may be less than 1% of the noise caused by the charge preamplifier. As an example, FIG. 6 illustrates, from measurements obtained by means of a spectrometry chain according to the invention, the aspect of signals V1 (curve A) and V2 (curve B): the practically invisible pulses on curve A are very visible on curve B. V2 is an image of the current I1.

Figure 7:
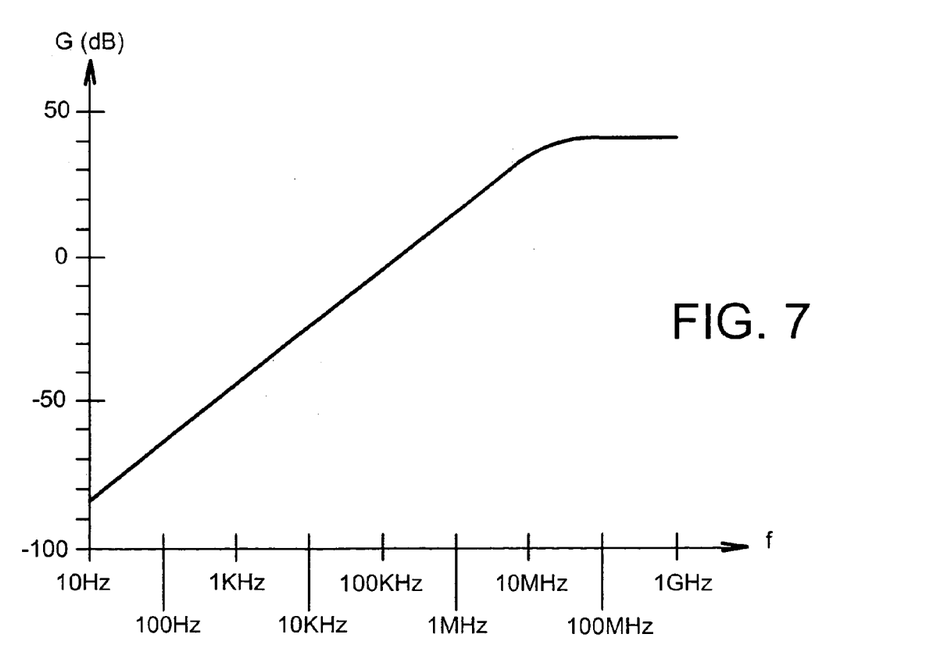
FIG. 7 shows the aspect of Bode's diagram for the high-pass filter formed by the differentiator stage of the processing circuit according to the invention.

The differentiator stage 25 behaves like a high pass-filter. FIG. 7 shows Bode's diagram of such a stage when selecting a time constant R° C' equal to one microsecond.

The low frequency noise (1/F noise) is attenuated but not the high frequency noise, as the differentiator only forms the high-pass portion of a band-pass filter.

The third stage 26 is a switch controllable integrator stage which implements the mathematical integral function. Unlike the processing circuit of the prior art, in the processing circuit according to the invention, it actually is an integration which one wants to produce, not only a detection of the amplitude of the pulses obtained at the output of the pulse filter: a voltage V3, image of the amount of charges provided by the detector is obtained.

The integrator stage 26 includes an integrator with an operational amplifier A'2 with an integration capacitor C'3 mounted between its input and its output. Its input is connected to the output of the differentiator stage 25 via a resistor R'3. The integrator is controllable by switching. A first switch SW'1 mounted between the output of the differentiator stage 25 and the resistor R'3 and a second switch SW'2 mounted in parallel with the integration capacitor C'3 are provided. The first switch SW'1 will control the integration function and the second switch SW'2 will control the resetting of the integrator. After having processed information relating to the interaction of a particle, the integrator is reset to zero before it processes information relating to another particle.

Switches SW'1, SW'2 are controlled by a logic circuit 28 which is enabled by an ACT signal appearing at the output of a comparator 29, this comparator being intended for comparing the signal V2 present at the output of the differentiator stage 25 with a threshold S', this threshold should be higher than the noise voltage of V2.

As a reminder, signal V2 is a signal, image of the detector current I1. In FIG. 5, reference A illustrates the aspect of the detector current I1, reference B illustrates the aspect of the signal V1 at the output of the preamplifier stage, reference C illustrates the aspect of the signal V2 at the output of the differentiator stage, reference D illustrates the aspect of the signal V3 at the output of the integrator stage.

Before instant t'0, signal V2 is less than the threshold s', the first switch SW'1 is open and the second switch SW'2 is closed. The signal V3 at the output of the integrator is at a low level. The comparator 29 delivers the enable signal ACT of the integrator. Before instant t'0, the ACT signal has a low level. This signal is illustrated with reference E of FIG. 5.

At instant t'0, signal V2 exceeds the threshold s', the ACT signal at the output of the comparator 29 passes to a high level, enables the logic circuit 28 which controls the closing of the first switch SW'1 and the opening of the second switch SW'2.

The integrator begins to integrate and delivers a signal V3 such that:

$$V3(t) = -\frac{1}{R'3C'3} \int V2(t)dt \qquad (4)$$

By combining expressions (3) and (4), it is found that:

$$V3(t) = \frac{R'C'}{R'3C'3C'1} \int I1(t)dt \qquad (5)$$

By combining expressions (5) and (1), it is found that:

$$V3(t) = -\frac{R'C'}{R'3C'3C'1} Q' \qquad (6)$$

The signal V3(t) delivered by the differentiator stage is proportional to the amount of charges which have interacted, for one particle with the detector, and therefore to the energy of the particle.

At instant t'1, signal V2 again passes below the threshold s', the first switch SW'1 is open and the second switch SW'2 retains is open state. The signal $$V3( ) = -\frac{R'C'}{R'3C'3C'1} \int I1(t)dt$$

is saved in a memory 27.1 of an acquisition stage 27 of the spectrometry chain, object of the invention, this acquisition stage being connected to the output of the integration stage 26. Signal V3 is digitized beforehand by a analog/digital converter 27.2 which is found in the acquisition stage 27. The time during which acquisition is performed is controlled by a pulsed signal CLACQ delivered by the logic circuit 28 at instant t'1 and the duration of which (t'2−t'1) is sufficient so that the acquisition may be carried out properly. Signal CLACQ is illustrated with reference F in FIG. 5. This signal has a rising edge at instant t'1.

When this duration has elapsed, i.e., at instant t'2, the CLACQ signal has a falling edge. The integrator is reset to zero and the signal V3 again passes to the low level. The integrator is ready to process a signal from another particle. The integrator only operates during a duration substantially equal to the duration Tm of the pulses of the detector current I1. In other words, integration only occurs during the life time of the pulses of the detector current I1.

The assembly formed with the differentiator stage and the integrator stage forms a band-pass filter. But what is of high interest is that the time constants of the band-pass filter are self-adaptive according to the shape of the detector current I1. This advantage is obtained by the fact that the integration only substantially occurs during the duration Tm of the pulses of the detector current I1.

Figure 8:
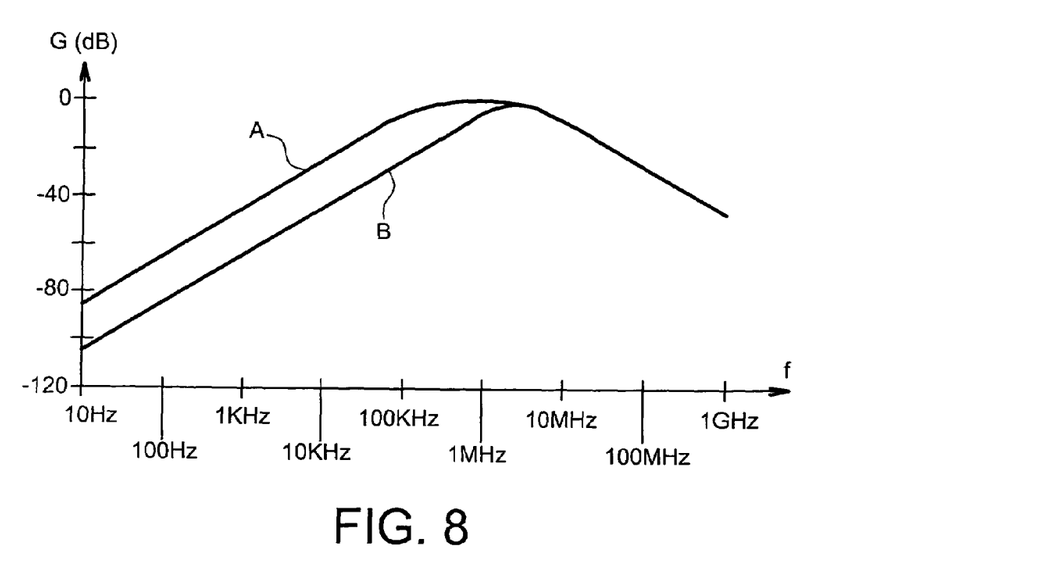
FIG. 8 shows the aspect of Bode's diagram for the band-pass filter consisting of the assembly formed by the differentiator stage and the integrator stage of the processing circuit according to the invention.

FIG. 8 illustrates Bode's diagram for two band-pass filters of processing circuits according to the invention. The central frequency of the filter is expressed by fc=0.44/Tm, its gain by Gdc=Tm/R'3C'3 and the processing time for a particle, in the event, a photon, is 1.5 µs including the reset.

Curve A is obtained with Tm=0.1 µs and curve B for Tm=1 µs. For each particle, regardless of its location of interaction with the detector, the duration Tm of the detector current I1 and the rise time at the output of the preamplifier will lock the central frequency fc of the band-pass filter, so that an optimal signal-to-noise ratio may be maintained. Such a processing circuit is self-adaptive to the detector with which it cooperates in the spectrometry chain. It adapts to the detector regardless of its thickness without any setting of any external parameter.

Figure 9:
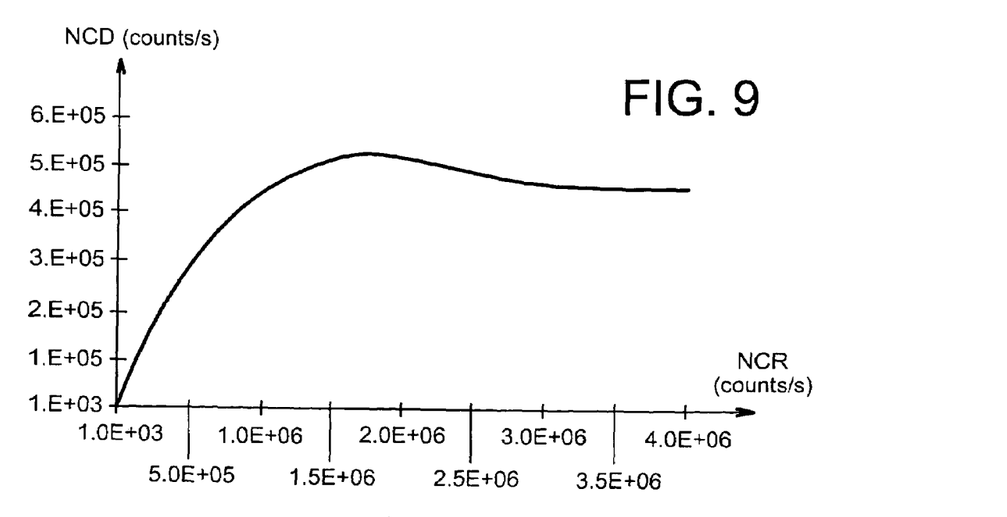
FIG. 9 illustrates the linearity of a spectrometry chain according to the invention.

The curves of FIGS. 7 and 8 were obtained with a spectrometry chain prototype according to the invention assuming the shape of a single channel probe for determining the combustion rate of irradiated assemblies by measuring cesium 137 and europium 154, simultaneously. Such a probe may perform spectrometric measurements between 100 keV and 2 MeV. The detector is a CdZnTe bar detector with a thickness of 1 centimeter. A particle radiation cesium 137 source was used. The curve in FIG. 9 illustrates the change in the number of counts (i.e. particles) detected per second (NCD) by the probe throughout the spectrum versus the number of particles per second (NCR) emitted by the source and arriving on the detector. The spectrometry chain has good linearity up to about $1.5 \cdot 10^6$ counts/s. Beyond, the number of detected counts/s decreases whereas the number of counts/s arriving on the detector continues to increase.

As compared with performances of conventional spectrometric chains with a high counting rate, for example of the EG§G973U type (this reference is that of a chain well-known to experts: it appears in the catalogue of the manufacturer ORTEC), with a germanium detector, the obtained counting rate is five times higher and this with a thick detector in which the transit time of the particles is about 1 µs which is much more unfavorable than the germanium detector.

Although a certain embodiment of the present invention has been illustrated and described in detail, it will be understood that different changes and modifications may be provided without departing from the scope of the invention.

The invention claimed is:

1. A processing circuit for a spectrometry chain including a particle radiation detector (21), including a charge preamplifier stage (20) receiving a pulsed current (I1) from the detector, representative of the amount of charges emitted by a particle which has interacted with the detector, an integrator stage (26), a differentiator stage (25) connected to the charge preamplifier stage (20), the differentiator stage (25) receiving a signal (V1) from the charge preamplifier stage (20) and delivering to the integrator stage (26), a signal (V2), image of the detector current (I1), the integrator stage (26) delivering an image (V3) of the amount of charges emitted by a particle which has interacted with the detector, characterized in that the integrator stage (26) is formed with an integrator which cooperates with means (28, 29), SW'1, SW'2) for controlling the integration time substantially during the duration of each pulse of the detector current, the differentiator stage (25) being directly connected to the assembly formed with the integrator and means for controlling the integration time, the differentiator stage (25) and the assembly forming a band-pass filter with self-adaptive time constants.

2. The processing circuit according to claim 1, characterized in that the charge preamplifier stage (20) includes a discrete or integrated amplifier (A'1) mounted as a current integrator.

3. The processing circuit according to claim 1, characterized in that the differentiator stage (25) includes an operational amplifier (A') mounted as a differentiator.

4. The processing circuit according to claim 1, characterized in that the integrator stage (26) includes an operational amplifier (A'2) mounted as an integrator.

5. The processing circuit according to claim 1, characterized in that the means for controlling the integration time include a first switch (SW'1) inserted between the integrator and the output of the differentiator stage (25), a second switch (SW'2) for resetting the integrator to zero, a logic circuit (28) for controlling the switches, a comparator (29) for enabling the logic circuit (28) according to the result of a comparison between the signal, image of the detector current (B2), and a threshold (s').

6. A spectrometry chain including a particle radiation detector (21), characterized in that it includes downstream from the detector (21), a processing circuit according to claim 5.

7. A spectrometry chain including a particle radiation detector (21), characterized in that it includes downstream from the detector (21), a processing circuit according to claim 1.

8. The spectrometry chain according to claim 7, characterized in that it includes a circuit for acquiring (27) the signal (V3) delivered by the integrator stage (26) of the processing circuit, this acquisition circuit (27) including a analog/digital converter (27.2) followed by a memory (27.1).

9. The spectrometry chain according to claim 8, characterized in that a signal (ACT) delivered by the logic circuit (28) conditions the acquisition time.

10. The spectrometry chain according to claim 7, characterized in that the detector (21) is inserted with a resistor (R'p) into a divider bridge circuit.

11. The spectrometry chain according to claim 7, characterized in that the detector (21) is a semiconductor detector.

12. The spectrometry chain according to claim 11, characterized in that the semiconducting material is selected from the group comprising CdZnTe, CdTe:Cl, CdTe:In.

* * * * *